US011937139B2

(12) United States Patent
Acar et al.

(10) Patent No.: US 11,937,139 B2
(45) Date of Patent: Mar. 19, 2024

(54) METHOD AND CLOUD SERVER FOR CLOUD BASED CLIENT STEERING

(71) Applicant: AIRTIES S.A.S., Paris (FR)

(72) Inventors: Irfan Acar, Istanbul (TR); Metin Ismail Taskin, Istanbul (TR); Raph Weyman, Istanbul (TR); Burak Onat, Istanbul (TR)

(73) Assignee: AIRTIES S.A.S., Paris (FR)

( * ) Notice: Subject to any disclaimer, the term of this patent is extended or adjusted under 35 U.S.C. 154(b) by 397 days.

(21) Appl. No.: 17/287,773

(22) PCT Filed: Oct. 22, 2019

(86) PCT No.: PCT/IB2019/059033
§ 371 (c)(1),
(2) Date: Apr. 22, 2021

(87) PCT Pub. No.: WO2020/084498
PCT Pub. Date: Apr. 30, 2020

(65) Prior Publication Data
US 2021/0385712 A1  Dec. 9, 2021

Related U.S. Application Data

(60) Provisional application No. 62/748,928, filed on Oct. 22, 2018.

(51) Int. Cl.
*H04W 36/08* (2009.01)
*H04W 28/08* (2023.01)
(Continued)

(52) U.S. Cl.
CPC ....... *H04W 36/08* (2013.01); *H04W 28/0838* (2020.05); *H04W 36/0083* (2013.01); *H04W 48/20* (2013.01); *H04W 84/12* (2013.01)

(58) Field of Classification Search
CPC ............. H04W 36/08; H04W 28/0838; H04W 36/0083; H04W 48/20; H04W 84/12
See application file for complete search history.

(56) References Cited

U.S. PATENT DOCUMENTS

2007/0211757 A1* 9/2007 Oyman ................. H04W 40/02
370/468
2008/0293404 A1* 11/2008 Scherzer ............... H04W 72/00
455/426.1

(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Marisol Figueroa
(74) *Attorney, Agent, or Firm* — Volpe Koenig

(57) ABSTRACT

Methods, systems, and apparatus' for optimizing network performance are described herein. A Cloud-Server may optimize one or more mesh networks of a plurality of 802.11 access points (APs) and stations (STA) connected to the APs. The Cloud-Server may work with a client steering daemon (CSD) miming on each AP. The Cloud-Server may operate in a location that is remote to the AP(s). The Cloud-Server may collect, store, and process network and client related data from one or more CSDs. The processing may include measuring network (e.g., premises) and client (e.g., STA) performance as well as analyzing (e.g., machine learning, etc.) to determine network parameters that will optimize network performance The Cloud-Server may then apply these network parameters to the relevant CSDs in order to improve per client and per network performance.

15 Claims, 4 Drawing Sheets

(51) Int. Cl.
*H04W 36/00* (2009.01)
*H04W 48/20* (2009.01)
*H04W 84/12* (2009.01)

(56) References Cited

U.S. PATENT DOCUMENTS

| | | |
|---|---|---|
| 2017/0086121 A1 | 3/2017 | Kaushik |
| 2017/0093722 A1 | 3/2017 | Gonzalez et al. |
| 2017/0374602 A1 | 12/2017 | Gokturk et al. |
| 2018/0213580 A1 | 7/2018 | Taskin et al. |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D3.0 (Jun. 2018).

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D5.0 (Oct. 2019).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std. 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 8: IEEE 802.11 Wireless Network Management, IEEE Std. 802.11v-2011 (Feb. 9, 2011).

\* cited by examiner

METHOD AND CLOUD SERVER FOR CLOUD BASED CLIENT STEERING

CROSS REFERENCE TO RELATED APPLICATIONS

This application claims the benefit of U.S. Provisional Application No. 62/748,928 filed Oct. 22, 2018 the contents of which is hereby incorporated by reference herein.

BACKGROUND

In the area of wireless communication networks, there may be a wireless device that connects to a first access point when the wireless device is within range of the first access point. The first access point may provide a connection to the Internet to the wireless device. The wireless device may move and it may be appropriate to connect to a different access point depending on a variety of factors. In some cases, there may be issues relating to facilitating and determining which access point to connect to when there is more than one option. Solutions for this, and other wireless communication problems including but not limited to wireless networks with multiple access points, are addressed herein.

SUMMARY

Methods, systems, and apparatus' for optimizing network performance are described herein. A Cloud-Server may optimize one or more mesh networks of a plurality of 802.11 access points (APs) and stations (STA) connected to the APs. The Cloud-Server may work with a client steering daemon (CSD) running on each AP. The Cloud-Server may operate in a location that is remote to the AP(s). The Cloud-Server may collect, store, and process network and client related data from one or more CSDs. The processing may include measuring network (e.g., premises) and client (e.g., STA) performance as well as analyzing (e.g., machine learning, etc.) to determine network parameters that will optimize network performance. The Cloud-Server may then apply these network parameters to the relevant CSDs in order to improve per client and per network performance.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Client steering methods that incorporate Cloud-Server and Client Steering Daemon (module) (CSD) may be described herein. A client steering daemon (CSD) may be embedded within a network device that resides at the end user premises, such as a home or office. A CSD may run or operate on a network device (e.g., be embedded), such as the way computer instructions are executed by a processor (e.g., hardware of a network device). An example network device may include, but is not limited to, a gateway, router, access point (AP), range extender, mesh access point, and/or repeater. A network device may have one or more components that may be interconnected, components such as: power source, a transceiver, radio, wireless connection, wired connection, memory, storage, processor, and the like. An example network installation may include multiple wireless network devices, such as a gateway and one or more APs, where each network device may have an embedded CSD, thus multiple CSDs may reside in a single local network. A Cloud-Server may be connected to a network device via the Internet. A Cloud-Server may be hosted by one or more computers. One or more network devices may provide access to the network to stations (STAs). As disclosed herein, the terms client and station (STA) are used interchangeably, and they may have the same meaning. A STA may have one or more components that may be interconnected, components such as: power source, a transceiver, radio, wireless connection, wired connection, memory, storage, processor, and the like.

Figure 1:
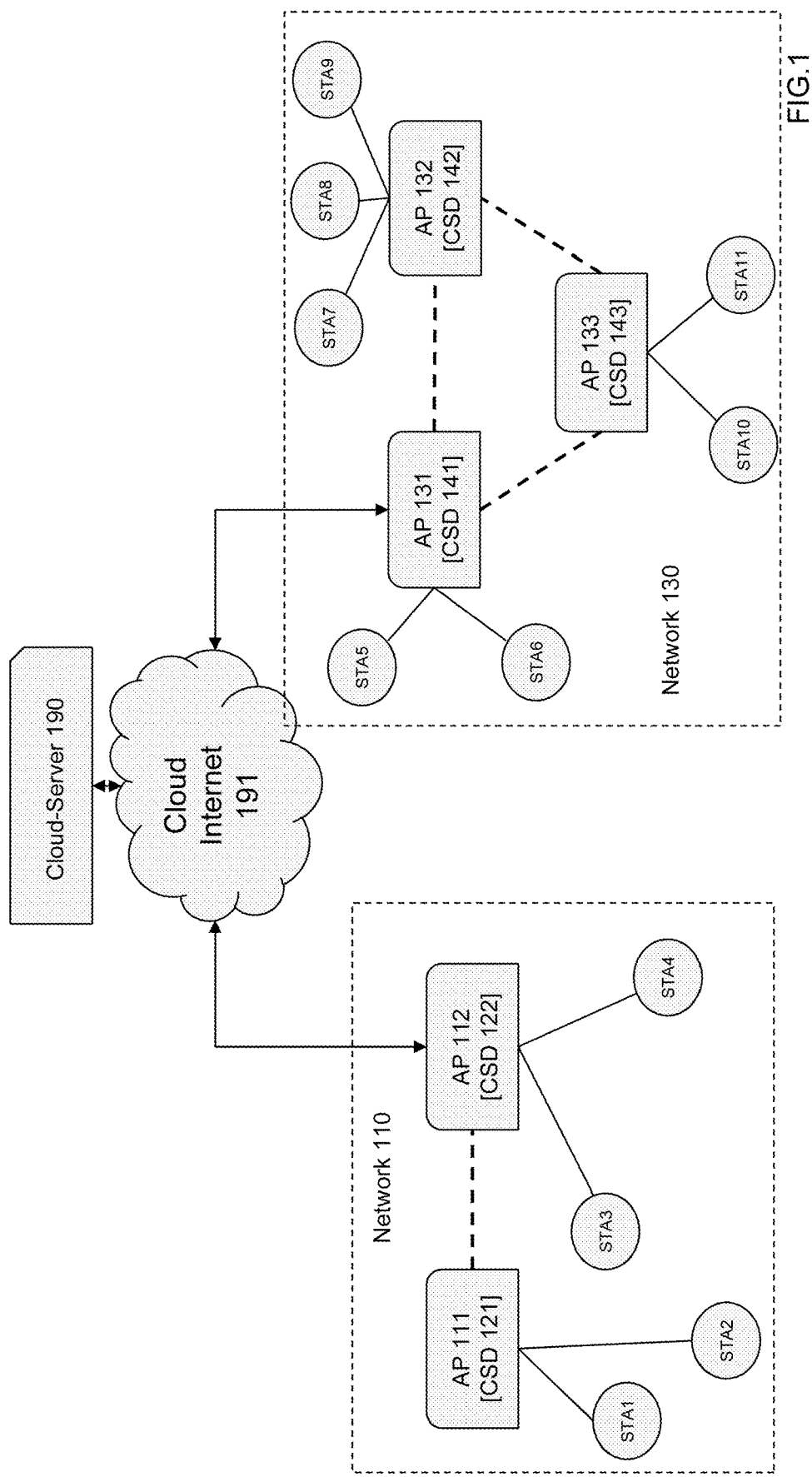
FIG. 1 illustrates an example communications system in which one or more disclosed examples and/or features may be implemented.

FIG. 1 is a diagram that illustrates an example wireless system of two separate mesh networks connected to a Cloud-Server 190 via the internet 191. Network 130 may have three mesh APs 131, 132, 133, and each run a CSD 141, 142, 143, respectively, that may connect to the Cloud-Server 190. Network 110 may employ two mesh APs 111, 112, which each run a CSD 121, 122, respectively. Each AP may be associated with one or more STA (e.g., STA1-11). Each CSD may work in concert with the Cloud-Server 190 and/or other CSDs to steering the STAs to optimize network performance, CSD performance, and/or STA performance. APs in a network (e.g., 110, 130) may be connected wirelessly, through Ethernet or through combination of both. APs may provide Internet 191 connection to STA1-11 in their respective networks (e.g., 110 or 130). There may be two-way communication between each CSD and the Cloud-Server (e.g., CSD 122 and Cloud-Server 190) via the hardware of the AP(s). Cloud-Server 190 may be connected to multiple distinct networks simultaneously, and may be able to communicate with multiple distinct networks simultaneously.

A Cloud-Server may operate in a location that is remote, or local, to the embedded CSDs. The Cloud-Server may keep active connections with one or more (e.g., millions) of CSDs simultaneously from any number of end user premises. The Cloud-Server may collect network and client related information from the CSDs and store the information. Once stored, the information may be analyzed, such as measuring some or all of the stored information. Once analyzed, the Cloud-Server may process the information to optimize network performance. Furthermore, the Cloud-Server may measure per network (e.g., per premise) and per client performance and, also, may find the best network parameters (e.g., through optimization methods described herein) and apply those network parameters to the CSDs in order to improve per client and per network performance.

There may be a client steering method that employs Steering Policies, in terms of Steering Profiles, for enabling customized steering actions per client for varying network conditions. A particular client (e.g., station) may be steered according to two types of Steering Profiles, which together may define the constraints and preferences for the steering. One of type may be "Steering Decision Profile," and another type may be "Steering Mechanisms Profile." Each client known to a system may be assigned a pair of profiles (e.g., one of each type).

A Steering Policy definition may include at least one pair of profiles; in some cases, a Steering Policy definition may include many pairs of profiles. Any number of STAs may be assigned the same profile pair. In one example, if a Steering Policy requires all client STAs to be steered according to the same criteria then it may need only include one profile pair, which may be assigned to all STAs. In another example, if a Steering Policy requires that every client STA is steered according to a unique criterion, then the policy may include as many profile pairs as there are client STAs.

A Steering Decision Profile (SDP) may define a set of parameters used for computing the cost of keeping (e.g., not steering) a client (e.g., STA) at an AP/interface. As such, SDP may define the cost metric and the parameters of the cost metric for computing the cost of connection with an AP/interface. A CSD may compute the cost associated with connection of a client with each AP/interface in the network, and select the AP/interface with the least cost as the best AP/interface. In one case, end-to-end throughput (e.g., from client to the root AP) may be used as the cost metric. As such, the decision on whether to steer a client from one AP/interface to another AP/interface may be based on which AP/interface would result in the least cost. In another case, load balancing may be used as part of the decision basis. For example, client steering decisions may be based on balancing the observed or forecasted load on the network. As such, clients may be distributed amongst the APs/interfaces of the network to balance the network load. In another case, link availability information may be incorporated into the end-to-end cost metric calculation to steer the clients to the AP/interfaces that can provide the highest expected end-to-end throughput. In another case, client capability information may be incorporated in the SDP to enable client capability aware steering. In another case, expected traffic demand may be incorporated in the SDP, or expected interference in the network may be incorporated in the SDP.

A Cloud-Server may generate SDPs by making use of information gathered from different and separate installations. For example, a Cloud-Server may generate an SDP that incorporates load balancing in the network and that also favors steering the clients with higher throughput capabilities, such as the clients that support 802.11ax, to 5 GHz band(s) isolating them from the other clients in the network. The Cloud-Server may push the generated steering decision profile to the networks that meet the same conditions, (e.g., networks that have a similar set of clients with similar capabilities, or that demonstrates similar network topology and performance).

SDPs may be updated by the Cloud-Server as the Cloud-Server obtains more information about the network performance. For example, the Cloud-Server may optimize the coefficients (e.g., parameters) used for cost computation as more information is gathered for certain types of clients. This way, the Cloud-Server may optimize the decision policies that should be used for each client for different network conditions and for different network management preferences. For example, in one case, clients may be steered such that the end-to-end (e.g., from wireless client to the root-AP) throughput is maximized. While the computations are carried out, the RSSI, TX/RX PHY rates, available airtime at each wireless link, and/or estimated load in every link may also be taken into account. Certain scenarios described herein may lead to the preference of creating decision profiles that favor certain types of clients, such that the throughput and delay performance of these clients are prioritized. For example, in one case, clients that support 802.11ax are kept at a 5 GHz band of the 802.11ax capable APs, whereas the other clients are kept at other interfaces so that they do not compromise the performance available to the 802.11ax capable clients.

A Steering Mechanism Profile (SMP) may define the set of actions (e.g., instructions), and/or also the parameters, that govern these actions, that may be applied to a client and the network devices in the network (e.g., APs) to move the client to or keep the client at an AP/interface that satisfies the SDP. Each wireless client in the network may have a separate and distinct steering mechanism profile. In one case, a SMP may include actions such as whether and when an 802.11v transition request message should be sent, whether the client should be deauthenticated if it does not obey the 802.11v message, whether the client should be blacklisted at certain APs, or whether the client should be exempt from steering actions. Furthermore, blacklisting durations, SSID hiding decisions, and durations may be governed by SMP.

The Cloud-Server may determine the Steering Policy, such as the SDP and SMP pair for each client. The CSD may receive the Steering Policy from the Cloud-Server and carry out the policy as defined by the SDP and SMP pair. When the Cloud-Server is not available, the CSD may generate Steering Policies just as the Cloud-Server performs this function (e.g., as described herein). Specifically, whereas the Cloud-Server may be capable of making use of information across various network installations for creating the SDP and SMP pairs, the CSD may make use of information gathered only from the local network (e.g., the network it is a part of). Furthermore, the Cloud-Server may be capable of making long-term analysis, correlating data across different network installations, and updating the profiles as new information is gathered.

Information about client behaviors may be collected by the CSD. This information may include: Client-AP RSSI measured at the AP the client is associated with and measured at other APs in the local wireless network; transmit and receive PHY rates; idle time of the client; Wi-Fi protocols (e.g., 802.11ax, 11 ac, 11n, 11v, 11k, 11r, etc.) supported by the client; physical layer attributes of the client (e.g., channel capability, bandwidth capability, number of transmit and receive antennas); and/or, other learned behaviors (e.g., traffic demand, download rates, etc.). Behavior learning may be an important component of the processes disclosed herein because, from their limited contextual knowledge, clients may prefer not to use some of their capabilities. With full contextual knowledge, system performance may benefit if the client is encouraged to use capabilities other than those that it favors. For example, a dual-band capable wireless client (e.g., a STA that uses 2.4 GHz and 5 GHz) may prefer to initiate a connection to a congested 2.4 GHz band even if an AP that supports both bands is available in the vicinity. Learning such behaviors is essential while applying actions and while creating profiles for the clients.

Figure 2:
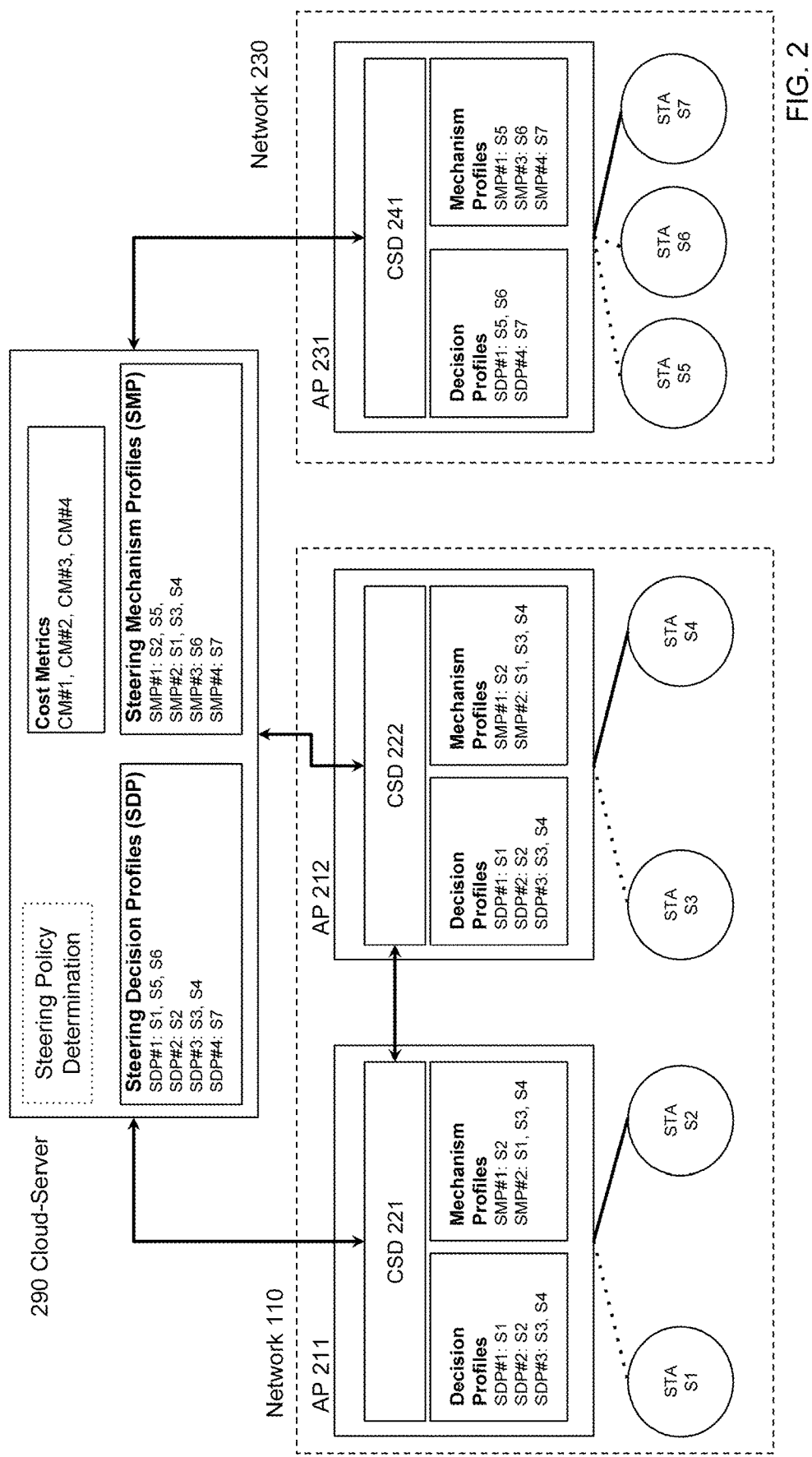
FIG. 2 illustrates an example of a Cloud-Server based steering systems.

FIG. 2 is a diagram that illustrates an example wireless system with steering policies with two separate networks connected to a Cloud-Server. Cloud-Server 290, based on data collected from the CSDs (e.g., 221, 222, 241), may generate steering profiles, such as Steering Decision Profiles (SDPs) and/or Steering Mechanism Profiles (SMPs), and keeps a pool of Steering Profiles. The Cloud-Server 290 may also keep track of SDP and SMP pairs assigned to STAs. As shown, different STAs may be assigned with the same SMPs and/or SDPs (e.g., Both STA S3 and S4 has been assigned SDP #3 and SMP #2). Also, in some cases the same type of STAs may be assigned with different SMPs and/or SDPs (not shown). The assigned SDPs and SMPs may depend on many factors, including but not limited to STA's behavior, STA's overall Quality of Experience (QoE), network's overall performance, interference in the network, load in the network, RSSI of STA. Network 110 may have two APs 211, 212, which both have a CSD 221, 222, respectively. Network 230 may have one AP 231 with embedded CSD 241. The CSDs 221, 222, 241 may send and receive information with Cloud-Server 290. The Cloud-Server may also have Cost Metrics (e.g., CM #1-4), as discussed herein, which may be sent to CSDs.

The Cloud-Server may employ a pre-defined steering policy, perform machine learning to derive a steering policy automatically from observed client behaviors, or may use any combination of either approach. The SDP and SMP themselves may be pre-defined or may be generated automatically by the Cloud-Server. The application of the SDP and SMP to each client under different network conditions may also be pre-defined in accordance with the performed machine learning. For example, while a client is assigned with steering decision profile #1 and mechanism profile #3, if the network is observed to be under relatively low interference then the client may be assigned with SDP #2, and if the network is observed to undergo heavy interference then the client may be assigned with SMP #4. Furthermore, the profiles assigned to each client may vary in time. Moreover, a steering profile pair applied to a particular client may vary depending on the other wireless clients in the network. For example, while a dual-band 802.11n client is assigned with a profile pair that favors a 5 GHz band taking into account the load on each AP/interface when there are no 802.11ax wireless clients in the network, the same client may be assigned a different profile pair that favors either non-802.11ax APs or 2.4 GHz bands of the 802.11ax capable APs, or low band of tri-band APs, when there are 802.11ax clients in the network.

In some cases, steering may be performed in order to achieve load balancing in a network. A CSD may compute a cost associated with a connection of a client with each AP/interface in the network, and may select the AP/interface with the least cost as the best AP/interface. The CSD may try to minimize the cost of reaching the gateway node from every STA in the wireless mesh network. CSD may use different cost metrics. In one case, the cost metric may be proportional to the end-to-end airtime use; thus, the aim of this equivalency may be to maximize the effective end-to-end rate.

The CSD may take into consideration that a STA may have more than two bands to connect to (e.g., 2.4 GHz, 5 GHz Low and 5 GHz High bands). Some tri-band network devices may use one of the high capacity bands (e.g., 5 GHz High band) for mesh backhaul and allow STAs to connect to the other two bands (e.g., 5 GHz Low and 2.4 GHz), thus avoiding the sharing of the airtime between the mesh backhaul traffic and the STA traffic. This approach may not be optimal with the new mix of Wireless Local Area Network (WLAN) STAs (e.g., conforming to 802.11ax, 802.11ac, 802.11n, or the like) that will share the same band. The 802.11ax STAs may have superior bandwidth sharing and spectrum efficiency capabilities; however, when mixed with 802.11ac and 802.11n STAs, most of those capabilities cannot be utilized. In order to benefit from a case that uses 802.11ax, it may be critical to have all 802.11ax STAs in the same collision domain without legacy (e.g., 802.11n/ 802.11ac) STAs. In such a case, when an 802.11ax STA is detected in the network, it may be better to steer it to the dedicated backhaul band so that the overall network capacity can be maximized.

Figure 3:
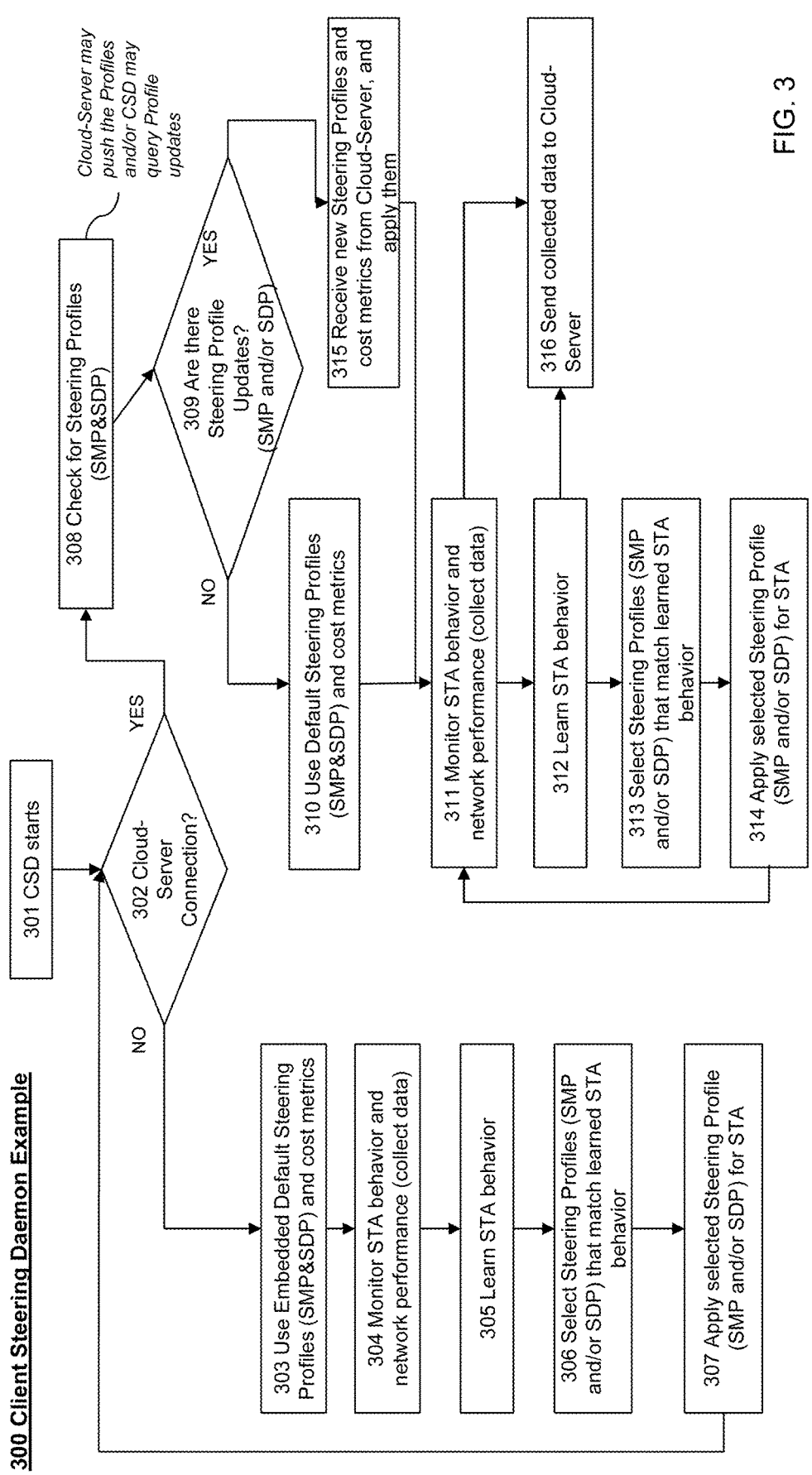
FIG. 3 illustrates a detailed example process related to a CSD based steering process.

FIG. 3 is a flow chart illustrating an example flow of operations performed by CSD. At 301 the processor starts, and at 302 the CSD may determine if there is a connection with a Cloud Server. If there is, the CSD at 308 may check for Steering Profile (e.g., update), where an updated set of SMPs and SDPs that may better match observed behavior of STA. The Cloud-Server may push the Steering Profiles Updates and/or the CSD may query Steering Profile Updates. At 309, if there are new Steering Profile updates available, at 315 the CSD may receive the Steering Profiles from Cloud-Server, otherwise at 310 if there are no updates the CSD may use the default Steering Profiles and cost metrics. At 303, if CSD is not connected with Cloud-Server, it may use the embedded default profiles. At both 304, and 311, the CSD may collect information related to STA behavior and network performance, and send the information to the Cloud-Server. If the CSD is connected to a Cloud-Server, the CSD at 316 may send the collected data to the Cloud-Server, but if it is not connected, it may proceed to the learning. At 305 and 312 the CSD may keep track of and learn STA behavior based on monitored data. Based on learned (e.g., estimated) behavior, at 306 and 313 the CSD may select the SDP and SMP that matches the learned behavior of the STA and network. The CSD may also receives cost metrics that are to be used for cost computation from the Cloud-Server. The SDP, SMP and cost metrics used by a CSD may change in time based on network and STA conditions. At 307 and 314, the CSD may apply the selected Steering Profile (e.g., SMP and/or SDP) for STA(s).

Figure 4:
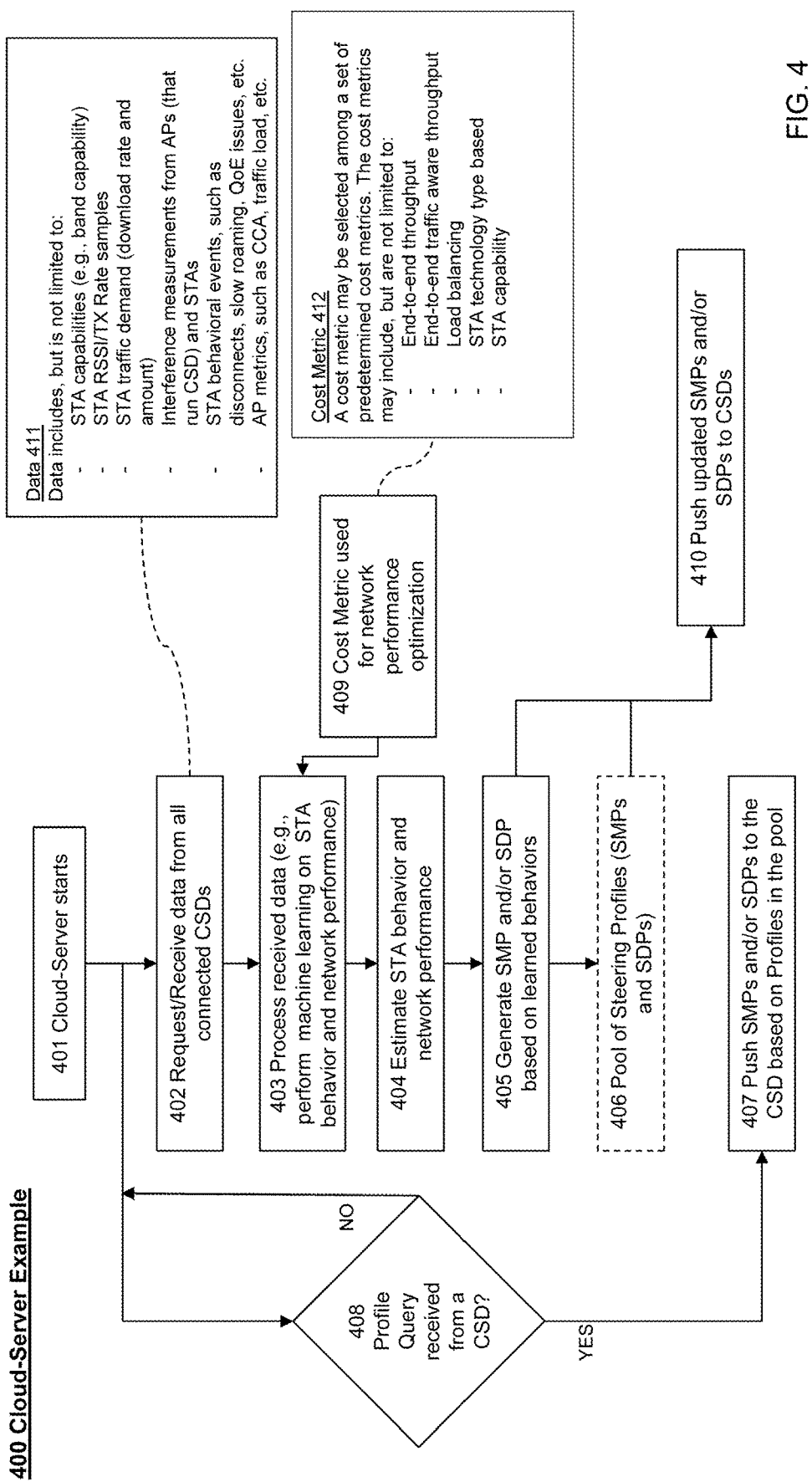
FIG. 4 illustrates a detailed example process related to a Cloud-Server based steering process.

FIG. 4 is a flow chart illustrating an example the of flow of operations performed by a Cloud-Server. At 401, the process may start, and at 402 the Cloud-Server may gather (e.g., request, received, etc.) data 411 from connected CSDs. APs that run CSDs may be located in distinct locations around the world. At 403, the Cloud-Server may process the collected data, correlate, draw conclusions, and/or perform machine learning to learn STA and network behavior. At 404, based on this the Cloud-Server may estimate STA and network behavior. At 409, the Cloud-Server may use cost metric for network performance optimization. Based on learned/estimated STA behavior, at 405 Cloud-Server generates SDP and/or SMP that optimizes STA's performance. At 406, the Cloud-Server puts the generated SDP and/or SMP in to a pool of Profiles. At 410, the Cloud-Server may push the generated Profiles to CSD(s); pushing may include instructing the CSD to employ a SMP/SDP. In some cases, the Cloud-Server receives a preference of specific cost metrics from the user (e.g., via the CSDs); the Cloud-Server may then distribute the cost metrics to all CSDs for a given one or more network as indicated by the user. In some cases, the Cloud-Server bases the processing on a cost metric. In some cases, the Cloud-Server may push only a subset of the generated steering profiles to a particular one or more CSDs, where the particular subset that is pushed will be relevant to that particular one or more CSDs; the Cloud-Server may determine that a subset of steering is relevant for a particular one or more CSDs based on the received data from that/those CSDs (e.g., steering profiles that relate to moving STAs to 5 GHz bands would only be relevant to the CSDs of the APs that are capable broadcasting on the 5 GHz bands).

Cost metrics may be employed for measuring, evaluating, and comparing STA and network performance. A cost metric may be defined by users, and fed into the Cloud-Server. User(s) may instruct the Cloud-Server to use a certain predetermined cost metric. User(s) may select a cost metric from a set of predetermined cost metrics. The Cost Metric 412 may be selected among a set of predetermined cost metrics, where these metrics may include, but are not limited to end-to-end throughput, end-to-end traffic aware throughput, load balancing, STA technology type based, and/or STA capability. Optionally, if the Cloud Server is set up to wait for a query at 408, the Cloud-Server may respond to Profile Queries of CSDs by sending up-to-date SDPs and/or SMPs, otherwise the cloud server may push SMPs/SDPs to the CSD based on profiles in a pool.

The Data 411 may include, but is not limited to, STA capabilities (e.g., band capability), STA RSSI/TX Rates samples, STA traffic demand (e.g., download rate and amount), interference measurements from APs operating a CSD and STAs, STA behavioral events (e.g., disconcerts, slow roaming, QoE issues, etc.), and/or AP metrics (e.g., CCA, traffic load, etc.).

Load balancing steering algorithms, as discussed herein, may take into account the STA capabilities, traffic load estimates for STAs and the backhauls, network topology, and external interference before making steering decisions.

Generally, a cost metric of a link may be proportional to the airtime used or equivalently inversely proportional to its physical rate R:

$$C \approx \frac{1}{R}$$

The end-to-end cost from a STA to the gateway node may need to take into account the total airtime used along the path. The accumulation of the cost along a path depends on whether the input and output links of a node operate on the same collision domain.

When the input and output links are on the same radio (e.g., same collision domain), a frame may occupy the airtime of the radio during both reception and transmission. The achievable bandwidth $B_s$ of these two consecutive links can be computed as shown in Equation 1.

$$B_s = \frac{1}{\frac{1}{R_i} + \frac{1}{R_o}} \qquad \text{Equation 1}$$

Where $R_i$ and $R_o$ are the physical rates of the input and output links, respectively.

Thus, the accumulated cost $C_s$ may be shown in Equation 2.

$$C_s \approx \frac{1}{R_i} + \frac{1}{R_o} \qquad \text{Equation 2}$$

If, on the other hand, the input and output links operate on different radios, the received frames can be transmitted almost concurrently, with only a small delay. Thus, the link with the smaller bandwidth becomes the bottleneck over a long time period and the effective bandwidth $B_d$ of the two links may be shown in Equation 3.

$$B_d = \min\{R_i, R_o\} \qquad \text{Equation 3}$$

In this case, the accumulated cost $C_d$ can be expressed in Equation 4.

$$C_d \approx \max\left\{\frac{1}{R_i}, \frac{1}{R_o}\right\} \qquad \text{Equation 4}$$

If the backhaul links operate on the same channel throughout the network, then the former approach is valid when computing the backhaul portion of the end-to-end cost. For STAs that operate in the same channel as the backhaul link (e.g., a 5 GHz STA on a network of dual-band APs with the backhaul operating on 5 GHz), the former equation should also be used to determine the STA to AP link cost. For STAs that do not share the same channel as the backhaul link (e.g., a 2.4 GHz STA on a network of dual-band APs with the backhaul operating on 5 GHz), the latter equation should be used to determine the STA to AP link cost.

Note that the interference ranges of the APs can be such that a link will potentially interfere with another link that is two or more hops away. In that case, a frame can also effectively occupy the airtime of neighboring radios.

Assuming a small mesh network where all backhaul links interfere with all other backhaul links, (e.g., due to both interference range and the hidden node problem), the backhaul portion of the cost may be computed as the sum of all backhaul link costs along the path (e.g., from the AP to gateway along the backhaul). For STAs that do not share the same channel as the backhaul link, the STA to AP link cost may be added to the AP to gateway cost. For STAs that operate in the same channel as the backhaul link, the overall cost is the maximum of STA to AP and the AP to gateway costs.

Generally, a steering cost metric may result in sending STAs to APs with faster links along a faster path. However, considering only the physical rate of a link ignores how much airtime of that link is already occupied. Connecting a STA to a fast but loaded link does not mean that the STA will be able to transmit and receive at full capacity as it will have to compete for airtime with other STAs.

A CSD may use the available rate of a link instead of its physical rate to compute the link cost C' as shown in Equation 5.

$$C' \approx \frac{1}{pR} \qquad \text{Equation 5}$$

In Equation 5, p is the ratio of available airtime of the link and R is the physical rate of the link.

In one example, it may be assumed that the estimated physical rate of a STA to AP link is 100 Mbps but the ratio of available airtime of the link is 0.2. For this example, this means that there are other STAs connected to the same AP and are actively transmitting and receiving, consuming 80% of the available airtime. Thus, the STA would only be able to send and receive 20 Mbps if it were connected to that AP. As a result, the cost of that link becomes five times higher than if it were unoccupied.

The accumulation of the cost metric along a path may be performed in the same manner as disclosed previously herein, with the only difference being that the link costs are scaled by available airtime. See Equations 6 and 7.

$$C'_s \approx \frac{1}{p_i R_i} + \frac{1}{p_o R_o} \quad \text{Equation 6}$$

$$C'_d \approx \max\left\{\frac{1}{p_i R_i}, \frac{1}{p_o R_o}\right\} \quad \text{Equation 7}$$

In Equations 6 and 7, $p_i$ and $p_o$ are the available airtime ratios of the input and output links, respectively.

Note that since this load-balancing steering cost metric takes into account the traffic loads, this metric may result in steering the STAs to faster and unoccupied links. While the original steering cost metric can drive STAs to APs with fast but heavily loaded links, the load balancing steering cost metric may instead select APs with moderately fast and unoccupied links, thus achieving better performance.

Generally, a steering process may be carried out in part by the CSD, which makes use of measured information, such as the Received Signal Strength Indicator (RSSI) between a STA and the APs in the wireless mesh network. While the RSSI between a STA and the AP to which it is associated is readily available through the wireless device driver of the associated AP, the RSSI between a STA and an AP to which it is not associated may be acquired by the non-associated AP through periodic monitoring (e.g., through either in-channel or off-channel monitoring) of control, management, and data frames transmitted by the STA. In order to avoid errant calculations/computations due to random RSSI fluctuations, a smoothing filter to average the recent RSSI values may be utilized.

A CSD may convert the RSSI to a cost metric by utilizing an empirical RSSI to physical rate conversion table as an intermediate step.

A CSD may perform a cost computation periodically for each STA associated with the AP. The CSD may compute the cost of using each possible path and try to steer the STA to the AP/band that leads to minimum airtime use. Steering decisions for a STA may be given by the CSD on the AP that the STA is associated to. However, CSDs on all APs may communicate with each other and act in coordination in order to steer a STA to the intended destination AP.

A CSD may learn band and channel capability and supported protocols (e.g., 802.11n, 802.11ac, etc.) of STAs and communicate this information to other steering modules in a mesh network. Thus, for example, the APs (e.g., CSDs) can decide to selectively respond only to the association requests of 5 GHz capable STAs in the 5 GHz band in order to encourage them to connect to the 5 GHz band instead of the 2.4 GHz band.

The steering decisions disclosed herein may depend on the potential cost improvement, RSSI difference, and both the associated and destination RSSI values. In order to avoid a ping-pong effect (e.g., where a STA may go back and forth between APs as soon as it gets to a new AP like a ping pong ball), a STA may not be steered unless there is the potential for a cost improvement above a threshold (e.g., considerable improvement that would warrant the move).

For STA steering, 802.11v Basic Service Set (BSS) Transition Management Requests may be employed in coordination with temporary blacklisting of STAs at all APs other than the intended destination AP. For STAs that do not support 802.11v or stubborn STAs, de-authentication/de-association may be employed as a last resort.

For the load-balancing cost metric, a CSD may need information about available airtimes of links in addition to the RSSI. The CSD may estimate the availability of a link based on average recent traffic on the link. The time interval used for averaging past traffic may need to be taken into account: relying on very long averaging intervals may prevent the steering module from responding to short-lived changes in traffic patterns; on the other hand, using very short intervals may render the traffic forecasts unreliable and lead to frequent steering actions with unpredictable changing traffic patterns.

Every mesh AP may keep track of the traffic to and from each one of its STAs and its mesh links, such as the wireless link amongst the APs. In one case, mesh links may be Wireless Distribution System (WDS) links. By periodically sampling these counters and using the link rate information, the consumed airtime for each radio link may be calculated for a sliding window of time of a given length in the past.

The APs may also periodically scan all channels in all operating bands and perform Clear Channel Assessment (CCA) measurements (e.g., 30 to 50 ms in each second can be allocated for this task for off-channel scanning). When there is traffic, the AP may skip an instance of the measurement. Note that the CCA on the operating channel of the mesh backhaul link may be performed in synchronized fashion in order to avoid self-interference. The results of CCA measurements may be posted by all mesh nodes (e.g., the CSD of each AP) to a Cloud-Server where a channel selection algorithm is being run. The Cloud-Server may examine the noise and interference levels of all channels and may determine the best channel for mesh backhaul links and the operating channels of the APs. The Cloud-Server may instruct the APs to switch their operating channels when it is favorable to do so.

By combining the average of the CCA measurements in the respective channels with the average consumed airtime due to traffic, the CSD may obtain an estimate for the available airtime ratio p of any given link.

Before the CSD can make a steering decision for a given STA, it may need to first determine a STA's traffic and then subtract its contribution to the airtime from the STA to AP link and from the backhaul links along the path from the associated AP to the gateway. This may give the CSD an estimate of the available airtimes of links if the STA were not connected to the mesh network at all. Starting from this topology, the CSD may then calculate the costs associated with the STA being connected to any one of the APs in its range and make a decision as to whether it would be favorable to steer that STA to another AP or band.

Each STA may be a known set of capabilities. A CSD may employ heuristic rules for distributing STAs among the APs in the mesh networks. For example, considering a mesh network of tri-band 802.11ax APs (e.g., where the AP includes three radios operating in the 2.4 GHz, 5 GHz Low, and 5 GHz High bands), with the backhaul links operating in the 5 GHz High band, a CSD may drive the 802.11ax-capable STAs to this band and keep non-802.11ax STAs away from that band in order to take full advantage of Orthogonal Frequency Division Multiple Access (OFDMA). The CSD may prefer the dual band 802.11n and 802.11ac STAs to connect to the 5 GHz Low band so that they can take full advantage of their capabilities. Finally, the CSD may prefer the legacy STAs to be connected to the 2.4 GHz band so that they do not drive down the performances of newer STAs. These rules may also be extended as band preferences. In an example, for backhaul links: i) 5 GHz High, ii) 5 GHz Low iii) 2.4 GHz. In an example, for 802.11ax STAs: i) 5 GHz High, ii) 5 GHz Low, iii) 2.4 GHz. In an example, for 802.11n and 802.11ac STAs: i) 5 GHz Low, ii) 5 GHz High, iii) 2.4 GHz. In an example, for legacy STAs: i) 2.4 GHz, ii) 5 GHz Low, iii) 5 GHz High.

One way to achieve these rules may be to use selective probe responses when a CSD knows the capabilities of the STAs, thereby steering them to connect to their preferred band. Once in their preferred bands, the CSD may make it harder for them to leave their preferred bands by unfavorably biasing the steering RSSI thresholds and minimum cost gain ratios. If they get steered away to non-preferred bands due to very poor performance in their preferred bands, the CSD may make it easier for them to return to their preferred bands by favorably biasing the steering RSSI thresholds and minimum cost gain ratios. The biased thresholds may be determined empirically. The biased thresholds may be also be determined using machine learning.

Note that the CSD may make the band steering decisions automatically based on available airtime as the current band gets very crowded.

As discussed herein, the steering methods may employ Steering Policies, in terms of Steering Profiles, for enabling customized steering actions per client for varying network conditions. Two types of Steering Profiles together define the constraints and preferences according to which a particular client (e.g., STA) should be steered; one type may be "Steering Decision Profile," and another type may be "Steering Mechanisms Profile." Each STA known to the system may be assigned a pair profiles—one of each type.

A Steering Policy definition may include at least one pair of profiles; in some cases, a Steering Policy definition may include many pairs of profiles. Any number of STAs may be assigned the same profile pair. In one example, if a Steering Policy requires all STAs to be steered according to the same criteria then it may need to include only one profile pair, which may be assigned to all STAs. At the other extreme, if a Steering Policy requires that every STA is steered according to a unique criterion, then the policy may include as many profile pairs as there are STAs.

A full definition of the steering policy applicable to a particular installation consists of the set of profiles and assignments for every STA known to that installation.

The full definition of steering policy may be downloaded from the Cloud-Server to a network device (e.g., network node, AP, router, gateway, etc.) firmware following the device boot and may be updated or entirely replaced by the Cloud-Server at any time. The steering policy may be updated when additional STAs become known to the system or when changes in STA behavior are observed.

Policy updates may be pushed by the Cloud-Server as soon as they are available. If a push mechanism is not available for a particular installation, then the AP firmware polls the server for updates at least once per time increment (e.g., 10 minutes).

In order for the CSD to operate regardless of the availability of the Cloud-Server, a default set of steering profiles defining a basic steering policy may be built into a default device data model, which may be preconfigured on the network device prior to being placed in service. For example, when a new STA first becomes known to the system, a CSD may assign it a default Steering Decision Profile and a default Steering Mechanisms Profile. The STA may be steered in accordance with its assigned default profiles until such time as the Cloud-Server overrides the assignment.

The determination of the Steering Policy by the Cloud-Server may facilitate a rapid iterative development and deployment cycle with much lower overhead than if the functionality were implemented in firmware.

A CSD may employ a baseline Steering Decision Policy upon which the more advanced and machine learned policies may be built as new information about the STAs, the network, interference, and the like are learned. In one case, a baseline decision policy may be such that for deployments consisting solely of Dual-Band Access Points, the Steering Decision Policy may be defined by a single Steering Decision Profile with pre-determined values and to which all STAs are assigned. The band preference may be biased toward 5 GHz, and there may be no Access Point preference. For deployments including one or more tri-band Access Points, the Steering Decision Policy may be defined by two Steering Decision Profiles; one of which prefers the 5 GHz Hi-Band and one of which prefers the 5 GHz Low-Band. Both profiles may prefer 5 GHz over 2.4 GHz and neither may have any Access Point preference. STAs newly connected to Tri-Band Access Points that support connectivity in the 5 GHz bands may be assigned one profile or the other in order to maintain balance. STAs that do not support connectivity in the 5 GHz bands may be assigned either profile.

A CSD may perform load balancing taking into account the data consumption of the STAs. Load Balancing by Data Consumption balances 5 GHz capable STAs between the two 5 GHz radio bands of Tri-Band Access Points according to the average data consumption of the STAs and of the 5 GHz backhaul links. The Cloud-Server may analyze historic data consumption for each STA and the backhaul links and determine an average daily consumption. The average may be weighted toward the most recent historic consumption with a progressively decaying contribution from less recent history.

STAs that support connectivity in the 5 GHz bands may be assigned one of the two profiles (e.g., by the CSD/AP or Cloud-Server via the CSD/AP) so as to keep the totals of the average daily data consumptions in each band as closely balanced as possible. STAs that do not support connectivity in the 5 GHz bands may be assigned either profile.

Where history is insufficient to determine the average daily data consumption for a connected STA, a CSD may initially assume, for the purposes of balancing, to have a data consumption equal to the average of all other STAs for which sufficient history is known. If no other STAs have sufficient known history then the CSD may revert to load balancing that is indicated in the Baseline Decision Policy for Tri Band Access Points.

Each generation of WLAN technology offers substantial performance advantages over previous generations. In every case the performance advantage is reduced if older generation STAs are also present. Accordingly, it may be advantageous to group STA and/or network devices by technology type.

A CSD may employ Station Grouping by Technology Type, which is a load balancing strategy with the objective of separating STAs that support specific iterations of technology (e.g., 802.11n, 802.11ac, 802.11ax, 2.4 GHz only, 5 Ghz only, Dual Band capable, etc.) from STAs that support other iterations of WLAN technology. If fully separated, then the performance advantages for most recent iterations of WLAN technology may be maximized.

A CSD may steer STAs between the 5 GHz bands according to their supported technology. when the Station Grouping by Technology Type is active, and when there is at least one Tri-Band Access Point deployed.

In one case, two Steering Decision Profiles may be required: one for STAs that support 802.11ax and one for all other STAs. STAs that are assigned a SDP such that STAs supporting 802.11ax at 5 GHz are steered with a strong preference for a particular 5 GHz radio band (e.g., 5 GHz Hi-Band) and STAs not supporting 802.11ax are steered with a strong preference for the other 5 GHz radio band (e.g. 5 GHz Low-Band). For mixed Access Point deployments in which some are Tri-Band and some are Dual-Band, or in which some APs support 802.11ax and some do not, SDP may also incorporate a preference for particular APs. The SDP assigned to STAs that support 802.11ax may incorporate a preference toward Tri-Band Access Points that support 802.11ax. The SDP assigned to STAs that do not support 802.11ax may have a neutral AP preference.

Optionally, STAs supporting only legacy WLAN technologies (e.g., 802.11a) may be further separated from STAs that support intermediate technologies (e.g., 802.11n, 802.11ac) by steering them with a strong preference for the 2.4 GHz radio band. If this option is taken, then a third SDP may be required to represent this 2.4 GHz band preference.

The Station Grouping by Technology Type strategy may be beneficial if both a significant number of STAs supporting the latest WLAN technology and a significant number of STAs supporting previous WLAN technologies are present. If all STAs support the latest technology, or all STAs support previous generation technologies, then this strategy may cause one of the radio bands to be redundant and could be counter-productive. In order to avoid this issue, Station Grouping by Technology Type may be activated only when certain conditions are met. As a minimum, the conditions include that there are more than a certain number of 802.11ax STAs and there are more than a certain number of non-802.11ax STAs. The required number of STAs may be predetermined via machine learning or may be machine learned dynamically by a Cloud-Server and delivered to a CSD. Whenever the conditions for activation are not met, the system may revert to a strategy of Load Balancing by Data Consumption.

The Steering Mechanisms Policy (SMP), defined by one or more Steering Mechanisms Profiles, may represent the constraints placed upon the choice of mechanisms that may apply to each STA. In particular, the policy may define, for each STA, how many steering attempts may be made using each mechanism and which mechanisms may not be used at all.

A CSD may employ a different number of SMPs. In one case, the CSD may have three SMPs that govern, such as 802.11v messaging, guidance by blacklist, and kick by forced disconnect. The CSD may perform machine learning locally, at the firmware level, when particular STAs react badly to steering and, if the reaction is sufficiently bad, the CSD may mark these STAs "untouchable". Untouchable STAs may be exempt from further steering action for a pre-defined period of time.

With Cloud Assistance (e.g., Cloud-Server determined steering) it may become possible to propagate knowledge of the behavior of one STA to other STAs of similar type, whether in the same or different premises. If, for example, a STA is discovered not to reconnect following a kick then the CSD may learn not to kick that STA or subsequent STAs of a similar type in future. Furthermore, the Cloud-Server may be informed about this learned behavior, so that the Cloud-Server may create new SMPs based on this learned behavior and push this SMP to the CSDs that run in networks with the same type of STAs. The learning process may be a shortcut for subsequent STAs and any initial disruption will be avoided.

A CSD may employ a baseline Steering Mechanisms Policy upon which the more advanced and machine learned policies may be built as new information about the STAs, the network, interference, and the like are learned. The policy may be defined by a single default Steering Mechanisms Profile to which all STAs are assigned, and by which the constraints for the use of each steering mechanism are based on. The CSD may apply each steering mechanism in turn according to the circumstances of that CSD, and will learn locally, as opposed to learning via Cloud-Server assistance, when a STA is to become untouchable.

A small number of STA types may represent a very large proportion of the STA population. Further, some of the most popular STA types may be prone to non-standard behaviors that can then have a disproportionately detrimental effect. Accordingly, static pre-configured special treatment of a small number of STA types can have a disproportionately beneficial effect on the population.

As such, a CSD may employ statically pre-determined Steering Mechanisms Profiles for particular STA types. In one case, if, for example, a popular type of mobile phone is known to follow 802.11v guidance well but to behave unfavorably following forced disconnection, a gentle Steering Mechanisms Profile with aggressive steering mechanisms excluded may be optimum. In another case, for each STA type that has been assessed and is known to favor particular steering mechanisms, the Cloud-Server may be configured with a pre-determined SMP and a method by which the STA type may be identified. Upon recognizing that a newly connected STA is of a configured type, the Cloud-Server may assign it the pre-determined Steering Mechanisms Policy.

STAs of a type either not configured or not recognized may be assigned the default Steering Mechanisms Profile of the Baseline Steering Mechanisms Policy.

In one case, in addition to the baseline profiles, an aggressive profile may be defined to make the steering algorithm more aggressive in steering certain clients. As an example, Table 1 and Table 2 show the parameters that are different between the baseline and aggressive steering profiles.

Table 1 is an example listing of baseline steering profile parameters

| Parameter | Value |
|---|---|
| rssi_history_value_low_2_4_ghz | 48 |
| rssi_history_value_high_2_4_ghz | 82 |
| rssi_history_value_low_5_ghz | 97 |
| rssi_history_value_high_5_ghz | 585 |
| threshold_guide_count | 12 |
| threshold_guide_tsms | 20000 |
| threshold_kick_count | 2 |
| threshold_kick_tsms | 240000 |
| rssi_max_threshold | −61 |
| rssi_mid_threshold | −71 |
| rssi_min_threshold | −75 |
| rssi_difference_threshold | 20 |
| max_percentage_difference | 0.60 |
| mid_percentage_difference | 0.40 |
| min_percentage_difference | 0.20 |

Table 2 is an example listing of aggressive steering profile parameters

| Parameter | Value |
|---|---|
| rssi_history_value_low_2_4_ghz | 10 |
| rssi_history_value_high_2_4_ghz | 48 |
| rssi_history_value_low_5_ghz | 26 |
| rssi_history_value_high_5_ghz | 97 |

Table 2 is an example listing of aggressive steering profile parameters

| Parameter | Value |
| --- | --- |
| threshold_guide_count | 8 |
| threshold_guide_tsms | 14000 |
| threshold_kick_count | 1 |
| threshold_kick_tsms | 240000 |
| rssi_max_threshold | −71 |
| rssi_mid_threshold | −75 |
| rssi_min_threshold | −77 |
| rssi_difference_threshold | 5 |
| max_percentage_difference | 0.20 |
| mid_percentage_difference | 0.15 |
| min_percentage_difference | 0.10 |

Although features and examples are described above are in particular combinations, one of ordinary skill in the art will appreciate that each feature or example can be used alone or in any combination with the other features and elements.

What is claimed:

1. A method for mesh network performance optimization performed by a Cloud-Server, the method comprising:
   receiving data from a plurality of client steering daemons (CSDs) each operating on an 802.11 access point (AP);
   performing processing on the received data, wherein the processing includes performing at least machine learning on the received data to determine a pair of client steering profiles for each CSD of the plurality of CSDs, wherein the pair of client steering profiles include a client steering decision profile (SDP) and a client steering mechanism profile (SMP), wherein the SDP is a set of parameters used for computing a cost of steering a client STA, and wherein the SMP is a set of actions for steering the client STA based on the corresponding SDP of a pair of client steering profiles;
   generating a pool of client steering profiles comprising a set of pairs of SDPs and SMPs based on the processing; and
   sending a subset of the generated pool of client steering profiles to each of the plurality of CSDs to enable client steering of the client STA based on a pair of client steering profiles from the subset of client steering profiles.

2. The method of claim 1, wherein the received data includes one or more of the following: station (STA) capabilities, STA RSSI/TX rate samples, STA traffic demand, interference measurements from access points (APs) and STAs, STA behavioral events, and AP metrics.

3. The method of claim 1, wherein the processing further includes consideration of cost metrics.

4. The method of claim 3, wherein the cost metrics include or more or more of the following: end-to-end throughput, end-to-end traffic aware throughput, load balancing, STA technology type, STA capability.

5. The method of claim 4, further comprising sending the cost metrics to the plurality of CSDs.

6. The method of claim 1, further comprising receiving a plurality of queries from the plurality of CSDs prior to receiving data, and in response, sending a request for data to the plurality of CSDs.

7. The method of claim 1, further comprising determining the subset of client steering profiles based on the received data from the plurality of CSDs such that the subset of client steering profiles is relevant to the receiving CSD.

8. A Cloud-Server for mesh network performance optimization, the Cloud-Server comprising:
   a processor; and
   a transceiver for sending and receiving signals coupled to the processor, wherein the processor and transceiver are configured to:
   receive data from a plurality of client steering daemons (CSDs) each operating on an 802.11 access point (AP);
   perform processing on the received data, wherein the processing includes performing at least machine learning on the received data to determine a pair of client steering profiles for each CSD of the plurality of CSDs, wherein the pair of client steering profiles include a client steering decision profile (SDP) and a client steering mechanism profile (SMP), wherein the SDP is a set of parameters used for computing a cost of steering a client STA, and wherein the SMP is a set of actions for steering the client STA based on the corresponding SDP of a pair of client steering profiles;
   generate a pool of client steering profiles comprising a set of pairs of SDPs and SMPs based on the processing; and
   send a subset of the generated pool of client steering profiles to each of the plurality of CSDs to enable client steering of the client STA based on a pair of client steering profiles from the subset of client steering profiles.

9. The Cloud-Server of claim 8, wherein the received data include one or more of the following: station (STA) capabilities, STA RSSI/TX rate samples, STA traffic demand, interference measurements from access points (APs) and STAs, STA behavioral events, and AP metrics.

10. The Cloud-Server of claim 8, wherein each CSD of the plurality of CSDs operates on an AP.

11. The Cloud-Server of claim 8, wherein the processing further includes consideration of cost metrics.

12. The Cloud-Server of claim 11, wherein the cost metrics include one or more of the following: end-to-end throughput, end-to-end traffic aware throughput, load balancing, STA technology type, STA capability.

13. The Cloud-Server of claim 12, wherein the processor and transceiver are further configured to send cost metrics to the plurality of CSDs.

14. The Cloud-Server of claim 8, wherein the processor and transceiver, prior to receiving data, are further configured to: receive a plurality of queries from the plurality of CSDs, and in response, send a request for data to the plurality of CSDs.

15. The Cloud-Server of claim 8, wherein the processor and transceiver are further configured to determine the subset of client steering profiles based on the received data from the plurality of CSDs such that the subset of client steering profiles is relevant to the receiving CSD.

* * * * *